(12) United States Patent
Venable

(10) Patent No.: US 6,928,612 B1
(45) Date of Patent: Aug. 9, 2005

(54) CREATING MULTI-PAGE DOCUMENTS USING TIFF FILES

(75) Inventor: Dennis L. Venable, Marion, NY (US)

(73) Assignee: Xerox Corporation, Stamford, CT (US)

( * ) Notice: Subject to any disclaimer, the term of this patent is extended or adjusted under 35 U.S.C. 154(b) by 820 days.

(21) Appl. No.: 09/694,626

(22) Filed: Oct. 23, 2000

Related U.S. Application Data

(60) Provisional application No. 60/168,293, filed on Dec. 1, 1999.

(51) Int. Cl.[7] .............................................. G06K 9/36
(52) U.S. Cl. ..................................... 715/521; 715/514
(58) Field of Search ................................ 715/507, 502, 715/521, 514; 345/583, 619, 588; 725/105; 395/615

(56) References Cited

U.S. PATENT DOCUMENTS

| | | | |
|---|---|---|---|
| 5,263,136 A | * | 11/1993 | DeAguiar et al. .......... 345/538 |
| 5,563,999 A | * | 10/1996 | Yaksich et al. ............. 715/507 |
| 5,666,503 A | * | 9/1997 | Campanelli et al. ........ 345/853 |
| 5,706,457 A | | 1/1998 | Dwyer et al. ............... 395/349 |
| 5,724,579 A | * | 3/1998 | Suzuki .................... 707/104.1 |
| 6,052,198 A | | 4/2000 | Neuhard et al. ........... 358/1.15 |
| 6,111,586 A | * | 8/2000 | Ikeda et al. ................. 345/619 |
| 6,567,983 B1 | * | 5/2003 | Shiimori ..................... 725/105 |

* cited by examiner

Primary Examiner—Sanjiv Shah
Assistant Examiner—Gautam Sain
(74) Attorney, Agent, or Firm—R. Hutter

(57) ABSTRACT

A system for organizing a heterogeneous set of page image data, such as including both simple-compressed and JPEG compressed, and/or color and monochrome data, so that the data can be organized as a single, multi-page, TIFF-FX document. Different page images and image components are named according to a simple convention. When a TIFF-FX writer application is applied to the data, the writer application responds to the names of the files and the file hierarchy to write a single, multi-page TIFF-FX document.

9 Claims, 1 Drawing Sheet

| Single Input File | Directory Of Input Files | Directory Of Directories |
|---|---|---|
| Single page TIFF-FX document | Multi-page TIFF-FX document | Multi-page TIFF-FX document |
| Profile: S, F, J, C, L | Profile: S, F, J, C, L | Profile: M only |
| SrcName | SrcName<br>— Page1<br>— Page2<br>— Page3<br>⋮ | SrcName<br>— Page1<br>   — Mask<br>   — Lower<br>   — Upper<br>— Page2<br>   — Mask<br>   — Lower<br>   — Upper<br>⋮ |

| Single Input File | Directory Of Input Files | Directory Of Directories |
|---|---|---|
| Single page TIFF-FX document | Multi-page TIFF-FX document | Multi-page TIFF-FX document |
| Profile: S, F, J, C, L | Profile: S, F, J, C, L | Profile: M only |

CREATING MULTI-PAGE DOCUMENTS USING TIFF FILES

REFERENCE TO PROVISIONAL APPLICATION

The present application claims priority from U.S. Provisional Application Ser. No. 60/168,293, filed Dec. 1, 1999.

FIELD OF THE INVENTION

The present invention is directed to a method for representing a multi-page document using a hierarchically-organized set of TIFF files.

BACKGROUND OF THE INVENTION

"TIFF-FX" is a proposed standard for the rendering and retention of image data. It is useful for transmission of facsimile-format documents over the Internet, and encompasses other standards such as JPEG, JBIG, and color fax standards. One aspect of TIFF-FX is that there is a special problem with rendering multi-page documents, and/or page images having multiple components (such as combinations of text, contone images, and line art) in a coherent format.

In TIFF-FX, different types of image components (text, line art, contone) can be compressed in various ways, such as JBIG, JPEG, or fax formats. The different compression arrangements or schemes are called "profiles." Examples of profiles are:
S=b/w, simple compression algorithm
F=b/w, richer compression algorithm
J=b/w, JBIG compression
C=color JPEG compression
L=color JBIG compression M=MRC="mixed raster content"=in each page, different components are compressed in different ways. Different components of a page image are organized as "mask," "upper," and "lower," which are ultimately combined to create a single, multi-component page image. Typically, the "mask" is text, compressed in binary, JBIG, or the fax compressions Modified Huffman, Modified Read, or Modified Modified Read. The "lower" portion is typically contone images compressed in JPEG. The "upper" portion is typically line art compressed in GZIP.

The present invention is directed to a system for organizing image data in a heterogeneous form, such as including both color and monochrome images, or images compressed according to different schemes, so that a TIFF-FX writer can automatically organize the data to create a single multi-page document.

DESCRIPTION OF THE PRIOR ART

U.S. Pat. No. 5,706,457 discloses a system for acquiring and archiving images derived from multiple sources. An operator of the system can perform only a predetermined set of functions corresponding to graphical icons. Each of the icons launches a set of macro functions that format the image data into a predetermined format.

U.S. Pat. No. 5,724,579 discloses a system for producing "subordinate images" extracted from our original image data. The subordinate image data can be images directed to a portion of the original data, or subset of the original data making a thumbnail of the original data. A first subordinate image is extracted from original image data, and a second subordinate image is in turn extracted from the first subordinate image data. The main image data and the first and second subordinate image data are stored in the same file.

U.S. Pat. No. 6,052,198 discloses a system for organizing files associated with a single job ticket, such as in a digital printing context. The job ticket includes information on print files included in a print job, print file location information indicating a location of print files in a storage device, and information indicating a location of a rasterized of version of a print file in the storage device. When the job ticket is submitted to a printing apparatus, a rasterized version of the data is submitted instead of the original print file if the rasterized version was modified after the print file was modified.

SUMMARY OF THE INVENTION

According to one aspect of the present invention, there is provided a method of organizing image data to create a multi-page document, comprising the steps of naming each of a set of files, each file representing either a page image or an image component of a page image, according to a naming convention, organizing the files into a hierarchical directory structure, and applying a writer application which recognizes the files by the naming convention to create a single, multi-page document.

DETAILED DESCRIPTION OF THE INVENTION

Figure 1:
FIG. 1 describes an input file organization according to an embodiment of the present invention.

According to the present invention, a naming convention and directory structure is used to identify individual page images and/or page image components within a multi-page document, so that a multi-page, multi-component "source file" can be created. The basic approach to converting many single page TIFF files into a single TIFF-FX file is to: (1) organize the original TIFF files into a specified architecture (by a combination of naming convention and directory structure); and (2) execute a known TIFF-FX writer application to convert the set of TIFF files into the TIFF-FX file.

The input data to the writer must be in a particular hierarchy on a disk to be properly handled. FIG. 1 describes the input file organization. It can be seen in the FIGURE that a TIFF-FX writer can recognize a single page input file, a directory of input files (for a multi-page document of simple pages), or as a directory of directories (for a multi-page document wherein some or all pages have multiple components, as described above). Quality Logic (formerly Genoa Systems) currently sells a product "TIFF-FXpert Test System" used to evaluate TIFF-FX files: this product can be used as a writer within the context of the present invention.

According to one embodiment of the present invention, there are three modes to the TIFF-FX writer. If the "source argument" (the name of the file desired to be considered a single document) is a simple file name, then a single page TIFF-FX file will be generated. In such a case, any profile may be requested except the MRC profile, M. If the source argument is a directory of files, then a multi-page TIFF-FX document is generated. According to the convention of one embodiment, each file in the directory must have a file name "PageN" where N is a page number starting with 1. Source files not obeying this convention are ignored. Once again, in this case any profile may be requested except the MRC profile, M.

To support the MRC profile, M, the source argument, may represent a directory of page directories. Each file must contain at least three files, which, in one convention, are named Mask, Lower, and Upper, corresponding to the roles described above in MRC profile layers. To test profile M, input data follow this format. All other files will be ignored.

According to one alternate embodiment, there may also be included, in the hierarchy, an "info" or "directive" file, which contains data relating to at least some of the other files within the same directory. This "info" file could include instructions that, for instance, the text in the mask within the same directory should be compressed in a specific way, such as in G3 format, or the contone data must be compressed in JPEG; also, the info file can specify a particular quality level for the compression algorithm.

In a preferred embodiment, all source files should conform to TIFF6 (baseline+standard extensions) specifications.

With all source images in the format described above, the TIFF-FX writer can proceed to read original data in various formats and emit the hierarchically-organized TIFF-FX files.

Although a TIFF-FX implementation is shown here, the basic principle can be applied to the creation of other multi-page document formats.

The present invention simplifies the testing and debugging of TIFF-FX images. TIFF-FX files can potentially represent many pages of image data, each page being quite complex (i.e., profile M). Real applications may require significant additional processing (e.g., segmentation of an image into Foreground, Background, and Mask layers). This representation allows separation of the development of segmentation algorithms from the development of the TIFF-FX writers/readers, and defines a common means by which developers can interchange test data. The present invention can be used to convert existing repositories of document data into TIFF-FX files. Scripts can be constructed that would take existing repositories and convert them into the appropriate hierarchy, then a TIFF-FX writer would generate the TIFF-FX files.

What is claimed is:

1. A method of organizing image data to create a multi-page document, comprising the steps of:

naming each file of a set of files, each file representing either a page image or an image component of a page image, according to a naming convention, the naming step including naming a file within the set of files as a directory of source files, including naming a file within the set of files as a directory of page directories, and wherein the page image components are MRC profile layers;

organizing said files into a hierarchical arrangement; and applying a writer application which recognizes the files by the naming convention to write a single file, multi-page document, the directory causing the writer application to generate a multi-page document with each page directory corresponding to a page, wherein each page directory includes a plurality of files, each file corresponding to a page image component for a single page image.

2. The method of claim 1, the naming step including providing a file within the set of files with a simple file name, the simple file name causing the writer application to generate a single page file.

3. The method of claim 1, wherein each file in the directory is named according to a naming convention which identifies each file within the directory as relating to a page.

4. The method of claim 1, wherein the page image components are MRC profile layers in TIFF-FX.

5. The method of claim 1, further comprising the step of including, among the set of files, a directive file, the directive file being readable by the writer application and instructing the writer application to process another file in the set of files in a predetermined manner.

6. The method of claim 5, wherein the predetermined manner relates to selecting a compression technique.

7. The method of claim 5, wherein the predetermined manner relates to selecting a quality level for a compression technique.

8. The method of claim 1, wherein a first file in the set of files is compressed according to a first compression scheme, and a second file in the set of files is compressed according to a second compression scheme.

9. The method of claim 1, wherein a first file in the set of files relates to a monochrome image, and a second file in the set of files relates to a color image.

* * * * *